United States Patent
Koga et al.

(10) Patent No.: US 6,518,718 B2
(45) Date of Patent: Feb. 11, 2003

(54) SPEED ELECTROMOTIVE FORCE PHASE CONTROL SYSTEM ADAPTED TO LOW SPEED

(75) Inventors: Syunsaku Koga, Nagoya (JP); Junichi Kitano, Nagoya (JP)

(73) Assignees: Central Japan Railway Company, Nagoya (JP); Railway Technical Research Institute, Kokubunji (JP)

( * ) Notice: Subject to any disclaimer, the term of this patent is extended or adjusted under 35 U.S.C. 154(b) by 92 days.

(21) Appl. No.: 09/815,681

(22) Filed: Mar. 23, 2001

(65) Prior Publication Data

US 2001/0028229 A1 Oct. 11, 2001

(30) Foreign Application Priority Data

Mar. 24, 2000 (JP) .......................................... 2000-084150

(51) Int. Cl.$^7$ ................................................. H02P 5/06
(52) U.S. Cl. ......................... 318/38; 318/135; 318/700; 318/687; 318/715
(58) Field of Search ................................ 318/135, 687, 318/138, 254, 437, 439, 685, 696, 700, 701, 705, 38, 712, 715

(56) References Cited

U.S. PATENT DOCUMENTS

| | | | | |
|---|---|---|---|---|
| 6,005,365 A | * | 12/1999 | Kaneko et al. | 318/700 |
| 6,037,739 A | * | 3/2000 | Hartramph et al. | 318/687 |
| 6,281,656 B1 | * | 8/2001 | Masaki et al. | 318/700 |

* cited by examiner

*Primary Examiner*—Nestor Ramirez
*Assistant Examiner*—Judson H. Jones
(74) *Attorney, Agent, or Firm*—Davis & Bujold, P.L.L.C.

(57) ABSTRACT

Three-phase/d-q converters convert an output voltage V outputted from a power converter and a coil current flowing through a propulsion coil to a voltage and a current in a dq rotary coordinate system, respectively. A speed electromotive force observer estimates speed electromotive force based on these voltage and current, and a vehicle angular speed ω, and a speed electromotive force phase generator calculates a speed electromotive force phase θe based on the estimated speed electromotive force Zd, Zq. A phase synchronization controller constituted as a secondary PI control system stabilizes the speed electromotive force phase θe and outputs it as a phase reference θ*. Accordingly, it is possible in a system of an LSM vehicle to obtain the stable phase reference θ* with a minimum deviation even when the vehicle is running at low speed.

4 Claims, 9 Drawing Sheets

<SPECIFIC CONSTITUTION OF CURRENT CONTROLLER 24>

<SPECIFIC CONSTITUTION OF SPEED EMF OBSERVER 25>

<SPECIFIC CONSTITUTION OF PHASE SYNCHRONIZATION CONTROLLER 30>

SPEED ELECTROMOTIVE FORCE PHASE CONTROL SYSTEM ADAPTED TO LOW SPEED

BACKGROUND OF THE INVENTION i) Field of the Invention

The present invention relates to a control system for a linear synchronous motor vehicle, and more particularly to a speed electromotive force phase control system adapted to low speed.

ii) Description of Related Art

A known example of conventional control systems for a linear synchronous motor (hereinafter referred to as "LSM") vehicle comprises, as shown in FIG. 7, a propulsion coil 61 provided along a guideway on a ground; a field coil 62a provided on a vehicle 62 so as to face the propulsion coil 61; a speed controller 63 for outputting a current command value I* computed by proportional-integral operation of the deviation between a speed command value v* and the actual speed v; a converter controller 64 for performing proportional-integral operation of the deviation between the current command value I* and a coil current I flowing through the propulsion coil 61 and outputting a voltage command value V* with a sine wave in synchronism with a position detecting phase θp as a phase reference to indicate the position of the vehicle; a power converter 65 for outputting a three-phase output voltage V in accordance with the voltage command value V* to the propulsion coil 61 through a feeder 66; a current detector 67 for detecting the coil current I flowing through the propulsion coil 61; a cross induction line 68a arranged along the track so as to obtain information about the vehicle position; a position detector 68 for detecting a relative position of the field coil 62a to the propulsion coil 61 based on a signal generated in the cross induction line 68a and outputting the position detecting phase θp; and a speed detector 69 for performing operation of an actual speed v necessary for speed control from the position-detecting phase θp and outputting the actual speed.

The propulsion coil 61, particularly as shown in FIG. 8A, is composed of coil sections, such as 71A1, 71B1, and 71C1 having a prescribed length and a plurality of groups of coils for propulsion therein, which are arranged on both sides of the vehicle 62 such that respective coil sections on one side are shifted by half of their length relative to respective coil sections on the other side. As shown in FIG. 8B, each coil section comprises a plurality of groups of coils for propulsion of three phases, i.e. U-phase, V-phase, and W-phase, respectively, which groups are arranged along the forward direction of the vehicle. By supplying three-phase alternating current to these groups of coils, shifting magnetic field is generated. A phase reference is predetermined by using the length of a group of coils for propulsion of 2.7 m as one cycle (360°) of an electrical angle, and information about the vehicle position is obtained by detecting the phase reference with the position detector 68.

The feeder 66 for supplying electricity, or outputting output voltage V, from the power converter 65 to each coil section consists of three feeder cables corresponding to three inverters 65A, 65B, and 65C, respectively, contained in the power converter 65. By controlling feeder section switches such as 72A1, 72B1 72C1 . . . (omitted in FIG. 7) separately, electricity is supplied only to the three lines of coil sections in the vicinity of the running vehicle 62.

For example, when the vehicle 62 runs in the right direction as shown in FIG. 8A, three feeder section switches 72C1, 72A2, and 72B2 are closed and electricity is supplied to the coil section 71C1 through a C-line inverter 65C, to the coil section 71A2 through an A-line inverter 65A, and to the coil section 71B2 through a B-line inverter 65B, respectively. When the vehicle 62 reaches the position corresponding to the coil section 71B2, a feeder section switch 72C2 is closed while the feeder section switch 72C1 is opened, with the result that power supply is stopped for the coil section 71C1 and started for the coil section 71C2 instead.

An LSM vehicle is driven by propulsion force generated by the interaction between a magnetic field generated by the field coil 62a, which is a superconductive coil, and a magnetic field generated in the propulsion coil 61 due to the three-phase output voltage V outputted from the power converter 65. To control driving of the LSM vehicle, the position detecting phase θp is inputted into the converter controller 64 as a phase reference indicating the position of the vehicle 62, and an actual speed v is computed by the speed detector 69 based on the position detecting phase θp. Therefore, accurate detection of the position detecting phase θp, i.e. the vehicle position, is required.

To fulfill this requirement, the cross induction line 68a is laid along the length of the track and a signal (an electric wave) is transmitted from the vehicle 62 to the cross induction line 68a. By processing a sine wave signal, which is generated in the cross induction line 68a due to the signal transmission from the vehicle 62, with the position detector 68, the position detecting phase θp is obtained. Thus, substantially accurate position detection is achieved.

However, the above-described method of detecting the position of the vehicle 62 requires accurate laying of the cross induction line 68a along the length of the track and maintenance thereof as well. It leads to a large amount of labor and high cost for construction and maintenance of the vehicle position detecting system.

To solve this problem, a method of detecting the vehicle position without providing a ground installation such as the cross induction line 68a has been thought out. In this method, electromotive force induced in the propulsion coil 61 due to the running of the vehicle 62 (hereinafter referred to as "speed electromotive force") is estimated, and a phase indicating the vehicle position (hereinafter referred to as "speed electromotive force phase") θe is obtained based on the estimated value. Specifically, as shown in FIG. 9, three-phase/αβ converters 81a, 81b convert the output voltage V outputted from the power converter 65 and the coil current I flowing through the propulsion coil 61 to voltages Vα, Vβ and currents Iα, Iβ, respectively, in α-β coordinate system. A speed electromotive force observer 82 estimates the speed electromotive force from the voltages Vα, Vβ, currents Iα, Iβ, and a vehicle angular speed ω, to obtain estimated speed electromotive force values Z α, Zβ. Resistance R and inductance L peculiar to the coil sections located in the neighborhood of the running vehicle 62 are further inputted as control constants to the speed electromotive force observer 82, and then, speed electromotive force phase calculator 83 computes the speed electromotive force phase θe by an equation (i) below.

$$\theta e = \tan^{-1} \frac{Z\beta}{Z\alpha} \qquad (i)$$

As described above, by computing the speed electromotive force phase θe and using the same as the phase reference instead of the position detecting phase θp, ground installations such as the cross induction line 68a and the position detector 68 become unnecessary. However, when the speed electromotive force phase θe, obtained by estimating the speed electromotive force as shown in FIG. 9, is used as the phase reference, there is a problem that the stable speed electromotive force phase θe cannot be obtained when the running speed of the vehicle is low (for example, the speed under 15 km/h).

Specifically, because the speed electromotive force phase θe is directly calculated by the above equation (i), it is likely to be affected by the control constants such as the resistance R and the inductance L of the coil sections. In short, this method has no robust stability against changes of the control constants, and when these control constants change according to a transition of the coil sections located in the neighborhood of the running vehicle 62, a deviation between the speed electromotive force phase θe and the actual vehicle position (phase reference) is apt to become substantial.

When the vehicle is running at high speed, the deviation is subtle and the speed electromotive force phase θe is capable to be utilized. However, when the vehicle is running at low speed, the speed electromotive force gets small and the deviation in θe grows large. As the deviation between the actual phase reference and the speed electromotive force phase θe grows large, it is difficult to use θe as the phase reference upon the drive control of the LSM vehicle.

SUMMARY OF THE INVENTION

Wherefore, a principal object of the present invention is to provide a control system for an LSM vehicle outputting to a propulsion coil a voltage corresponding to a voltage command value based on a current command value, a phase reference, etc., which overcomes the above mentioned problem and obtains the stable phase reference with a minimum deviation even when the vehicle is running at low speed.

This and other objects are accomplished with a speed electromotive force phase control system in a control system for an LSM vehicle driven by propulsion force obtained by an interaction between the magnetic field produced in a propulsion coil arranged along a guideway on a ground by an output voltage V outputted from a power converting means and a magnetic field produced by a field coil provided on the vehicle so as to face the propulsion coil, the speed electromotive force phase control system generating a phase reference θ as a vehicle position signal when the vehicle is running under a predetermined speed.

In the control system for an LSM vehicle, a voltage command value is outputted by a conversion control means based on the current command value outputted from a speed control means, a coil current I flowing through the propulsion coil detected by a current detection means and a vehicle position signal in the same manner as in the above described conventional driving control system. According to the voltage command value, the output voltage V is outputted to the propulsion coil by the power converting means.

In this case, the phase reference θ as a vehicle position signal with respect to the LSM including the field coil and the propulsion coil is the relative position of the field coil to the propulsion coil indicated in the form of an electrical angle. For example, in the case of the LSM in which a movable magnetic field is produced by supplying three-phase alternating current to the propulsion coil, the distance between a U-phase coil and the field coil in the running direction of the vehicle is indicated in the form of an electrical angle, which is used as the phase reference θ.

In the speed electromotive force phase control system according to the present invention, as shown in FIG. 1, firstly a dq conversion means 1 converts the output voltage V from the power converting means and the coil current I flowing through the propulsion coil to a d-axis voltage Vd, a q-axis voltage Vq, a d-axis current Id and a q-axis current Iq, respectively, in the dq rotary coordinate system. Then, based on the obtained voltages Vd, Vq, currents Id, Iq, and a vehicle angular speed ω, a speed electromotive force estimation means 2 estimates speed electromotive force induced in the propulsion coil.

Such estimation can be made, for example, by the observer theory in the modern control theory, and in that case, resistance, inductance and the like of the propulsion coil are used as control constants in an observer. The vehicle angular speed ω can be obtained in various manners, such as, for example, by differentiating the phase reference θ (i.e. the phase reference θ currently outputted) generated in the end by the speed electromotive force phase control system according to the present invention, or by converting the vehicle speed measured in some way to the angular speed, and so on.

Secondly, a Δθ calculation means 3 calculates a speed electromotive force phase correction amount Δθ, using a d-axis component Zd and a q-axis component Zq of the estimated speed electromotive force estimated in the speed electromotive force estimation means 2. In general, in the dq rotary coordinate system, the speed electromotive force is induced in either axis d or q theoretically. For example, when coordinate conversion is performed so that the q-axis component of the speed electromotive force may become zero (0), a predetermined direct current voltage is induced in the axis d. However, actually, when the LSM is driven, the speed electromotive force is generated also in the axis of which component is supposed to be zero (0) (i.e. axis q in the above example). When the LSM is controlled in the dq rotary coordinate system, generally the axis component which is supposed to be zero (0) is regulated to be zero (0). It should be noted that in the field dealing with power conversion equipment, transformation of electrical energy, etc., it is general to perform the coordinate conversion and the control so that the q-axis component may become zero (0) in the dq rotary coordinate system.

For instance, when the coordinate conversion is performed so that the q-axis component may become zero (0) as in the above example, the speed electromotive force phase correction amount Δθ is calculated by an equation (1) below. Incidentally, by exchanging a denominator and a numerator (i.e. Zd, Zq) in the following equation (1), the coordinate conversion that makes d-axis component become zero (0) can be done.

$$\Delta\theta = \tan^{-1}\frac{Zq}{Zd} \qquad (1)$$

Then, a speed electromotive force phase calculation means 4 calculates a speed electromotive force phase θe, by adding the speed electromotive force phase correction amount Δθ obtained from the Δθ calculation means 3 to the phase reference θ currently outputted.

The speed electromotive force phase θe obtained here by the equation (1) can be used directly as the phase reference θ. However, in order to obtain the stable phase reference θ with a minimum deviation even at low speed range when the speed electromotive force is small, a phase signal stabilization means 5 calculates a deviation (phase deviation) between the speed electromotive force phase θe and the phase reference θ currently outputted, and by performing proportional-integral operation of the phase deviation, it outputs the stable phase reference θ with a reduced deviation.

In the present invention, the expression "under a predetermined speed" means a speed range at which the speed electromotive force phase θe cannot be used as the phase reference θ when it is calculated in the conventional manner as shown in FIG. 9, for example. It is because the speed electromotive force becomes too small and the deviation of the speed electromotive force phase θe becomes too large to be ignored. Generally, when the vehicle is running at a speed under 15 km/h, for example, it is difficult to use the conventionally calculated speed electromotive force phase θe as the phase reference.

Specifically, in the speed electromotive force phase control system according to the present invention, the speed electromotive force phase θe is not directly calculated as in the conventional manner shown in FIG. 9, but is obtained by firstly calculating the speed electromotive force phase correction amount Δθ from the speed electromotive force in the dq rotary coordinate system and then adding the Δθ to the current phase reference θ. The computed speed electromotive force phase θe is further processed proportionally and integrally to be made stable, and outputted as a new phase reference θ in the end.

The coordinate conversion to the dq rotary coordinate system herein described includes a coordinate conversion to the dq0 rotary coordinate system in which a zero-phase-sequence component is taken into consideration. For example, when conversion to the dq rotary coordinate system is performed in case that the power conversion means is constituted as a three-phase four-wire system which allows for the zero-phase-sequence component, it is also necessary to consider the zero-phase-sequence component in the dq rotary coordinate system. In this case, the conversion is regarded as a conversion to the dq0 rotary coordinate system. The conversion to the dq rotary coordinate system by the dq conversion means according to the present invention is considered to include the conversion to such dq0 rotary coordinate system. The type of the coordinate system before the coordinate conversion by the dq conversion means is not limited to a three-phase alternating current coordinate system. A two-phase current coordinate system and other coordinate systems are also included.

According to the above speed electromotive force phase control system, the speed electromotive force phase θe is obtained by correcting the phase reference θ with the speed electromotive force phase correction amount Δθ obtained from the dq rotary coordinate system, and is outputted further as the phase reference θ through a phase signal stabilization means 5.

Therefore, it is possible to obtain the stable phase reference θ with the minimum deviation even when the vehicle is running at low speed which results in small speed electromotive force. Consequently, the speed electromotive force phase control system according to the invention makes it possible to obtain the stable phase reference θ with the minimum deviation even under the predetermined speed, although it was difficult to obtain the speed electromotive force phase θe when the vehicle is running at a speed under, for example, 15 km/h, as in the case of the conventional manner shown in FIG. 9.

In order to stabilize the speed electromotive force phase θe, the phase reference θ may be calculated in the following manner. Firstly, the phase signal stabilization means 5 performs proportional-integral and double-integral operation of a phase deviation between the speed electromotive force phase θe and the phase reference θ currently outputted, and adds up each computed value (so-called secondary PI control), to calculate the vehicle angular speed ω. Then, the vehicle angular speed ω is further integrated to obtain the phase reference θ.

When the vehicle is running at a fixed speed, a steady-state deviation of the phase reference θ can be reduced by performing proportional-integral operation of the phase deviation and adding up each calculated value (so-called primary PI control). When the vehicle is being accelerated or decelerated, however, the phase reference θ varies showing a quadratic curve and the steady-state deviation cannot be regulated sufficiently by the primary PI control.

By employing the secondary PI control which includes double-integral operation, the steady-state deviation upon accelerating and decelerating the vehicle can be reduced to nearly zero (0). Therefore, according to the above speed electromotive force phase control system, it is possible to obtain the stable phase reference θ with the reduced steady-state deviation.

In the speed electromotive force estimation means 2, for example, the estimated speed electromotive force values Zd and Zq are obtained by performing operation according to the following equation (2).

$$Z = GI - G \int \{AI + BZ + CV\} dt \quad (2)$$

where $$Z = \begin{bmatrix} Zd \\ Zq \end{bmatrix}, I = \begin{bmatrix} Id \\ Iq \end{bmatrix}, V = \begin{bmatrix} Vd \\ Vq \end{bmatrix}, G = \begin{bmatrix} g_{11} & g_{12} \\ g_{21} & g_{22} \end{bmatrix}$$

$$A = \begin{bmatrix} a_{11} & a_{12} \\ a_{21} & a_{22} \end{bmatrix}, B = \begin{bmatrix} b_{11} & b_{12} \\ b_{21} & b_{22} \end{bmatrix}, C = \begin{bmatrix} c_{11} & c_{12} \\ c_{21} & c_{22} \end{bmatrix}$$

and $$\left. \begin{array}{c} a_{11} \sim a_{22} \\ b_{11} \sim b_{22} \\ c_{11} \sim c_{22} \end{array} \right\} : \text{coefficients set by resistance and inductance of the propulsion coil, and the vehicle angular speed } \omega$$

$g_{11} \sim g_{22}$ : gain coefficients

The above equation (2) can be obtained by applying the observer theory in the modern control theory, for example. By setting appropriate values to each component g11–g22 (so-called observer gains) of a matrix G based on the result of experiments and simulations, etc., the estimated speed electromotive force value Z is stably and rapidly calculated, and comes to converge to a true value of the speed electromotive force. Using the estimated speed electromotive force value Z obtained as such makes it possible to obtain the accurate and liable speed electromotive force phase θe.

In the control system of the LSM vehicle, by employing the speed electromotive force phase control system according to the present invention, it is possible to obtain the phase reference θ from the speed electromotive force phase θe, without providing the equipment for detecting the vehicle position on the guideway. It is also acceptable to provide a position detecting phase generation means on the guideway to obtain a position detecting phase θp as a vehicle position signal, and input either of the speed electromotive force phase θe or the position detecting phase θp, selected by an input phase signal selection means, to the phase signal stabilization means 5 as the phase signal.

Specifically, there is an option of selecting either the speed electromotive force phase θe obtained from the speed electromotive force phase calculation means 4 or the position detecting phase θp obtained from the position detecting phase generation means on the guideway.

Such constitution allows the speed electromotive force phase θe to be used as a backup, for example, in case the position detecting phase generation means is out of order, and improves liability of the control system of the LSM vehicle much better.

BRIEF DESCRIPTION OF THE DRAWINGS

The invention will now be described, by way of example, with reference to the accompanying drawings, in which.

DETAILED DESCRIPTION OF THE INVENTION

Figure 1:
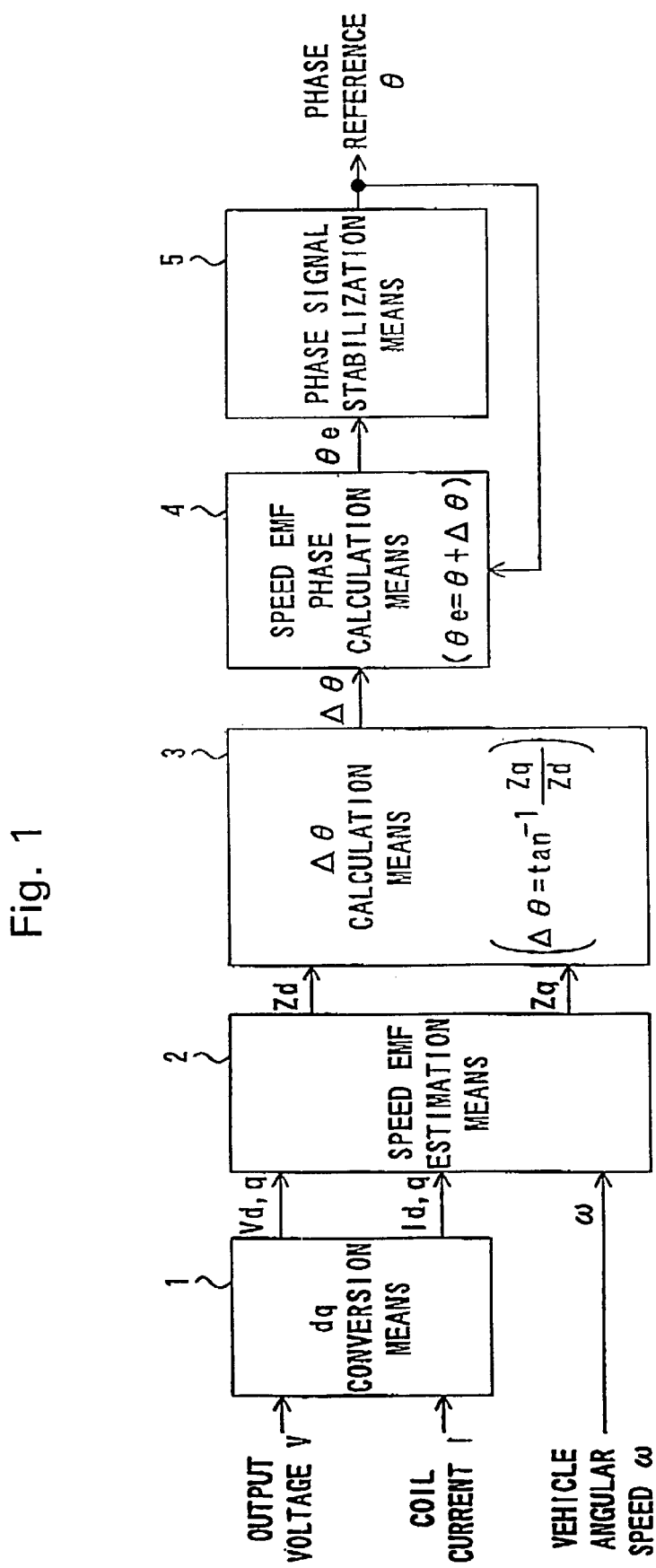
FIG. 1 is an explanatory diagram explaining a basic constitution of a speed electromotive force phase control system according to the present invention.
Figure 2:
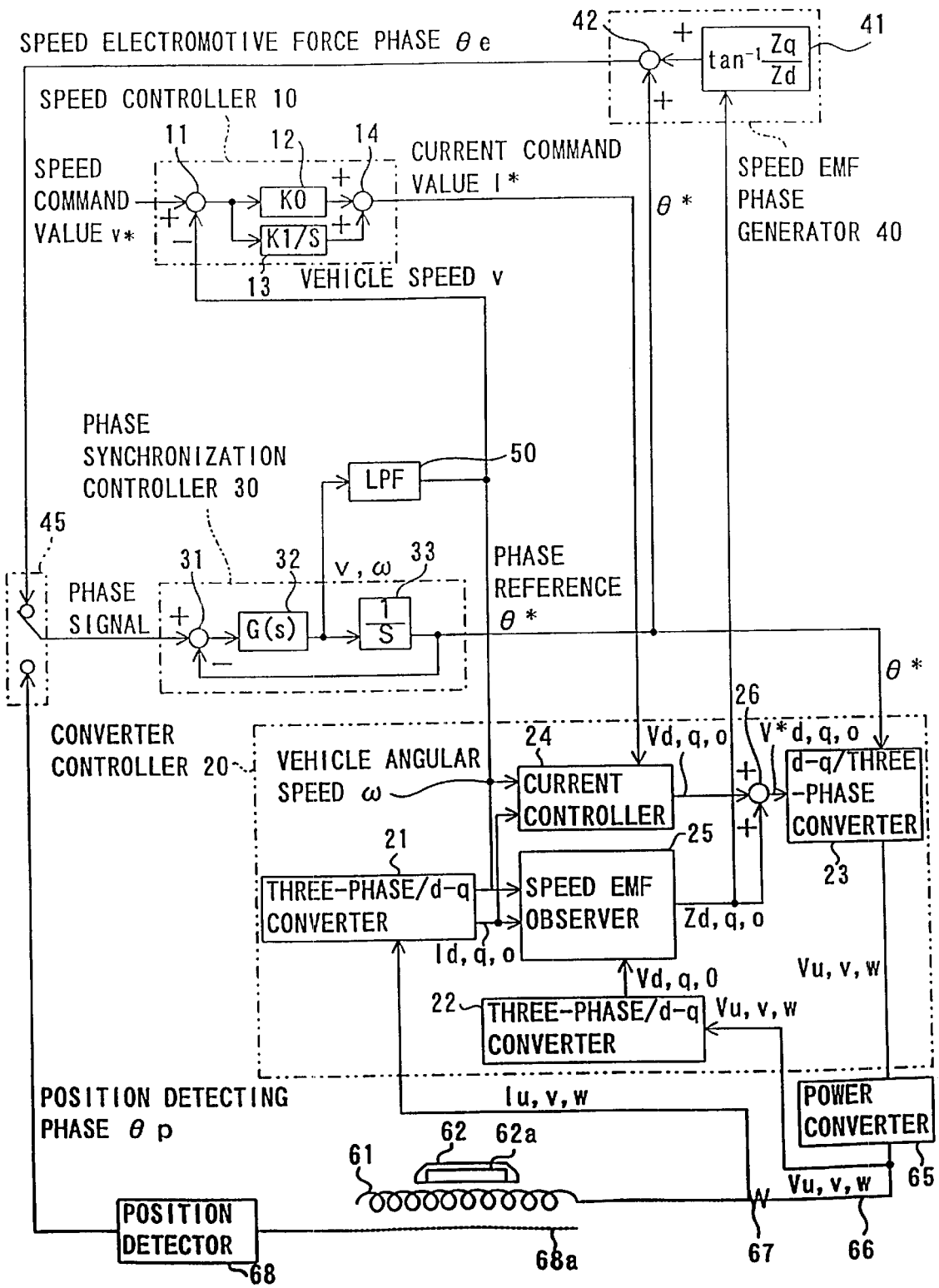
FIG. 2 is a schematic block diagram showing a schematic constitution of a control system of an LSM vehicle according to the present invention.

Referring to FIG. 2, a control system for an LSM vehicle mainly comprises a speed controller 10, a converter controller 20, a phase synchronization controller 30, a speed electromotive force phase generator 40, an input phase switch 45, a propulsion coil 61, a field coil 62a, a power converter 65, a feeder 66, a current detector 67, a position detector 68, and a cross induction line 68a.

The speed controller 10 is designed as a proportional-integral (PI). control system so as to perform following control over a speed command value v* in a predetermined cycle. By performing proportional-integral operation of a speed deviation between the speed command value v* and a vehicle speed (actual speed) v, the speed controller 10 computes a current command value I* and outputs the same. Specifically, the speed deviator between the speed command value v* and the vehicle speed v is calculated by an adder-subtracter 11, and proportional-integral operation of the speed deviation is performed by a proportionater 12 and an integrator 13, then the results of the operation are added by an adder-subtracter 14 to determine a current command value I*. This current command value I* is equivalent to a value (I*d, I*q, I*0) in dq0 rotary coordinate system.

The converter controller 20 compensates for a current deviation between the current command value I* outputted from the speed controller 10 and the current flowing through the propulsion coil 61 (hereinafter referred to as "the coil current"), and adds the compensation for the speed electromotive force induced in the propulsion coil 61 to compute an output voltage V (Vu, Vv, Vw) toward the power converter 65.

Specifically, the coil current I (Iu, Iv, Iw) detected by the current detector 67 is converted into the current (Id, Iq, I0) in dq0 rotary coordinate system by a three-phase/d-q converter 21. Then, in the current controller 24, computed voltage command value (Vd, Vq, V0) is obtained by the primary PI control based on a current deviation between the current (Id, Iq, I0) and the current command value I* ((I*d, I*q, I*0) in dq0 rotary coordinate system) outputted from the speed controller 10, and then outputted.

On the other hand, the output voltage V outputted from the power converter 65 is converted into the voltage (Vd, Vq, V0) in dq0 rotary coordinate system by a three-phase/d-q converter 22, and estimated speed electromotive force value (Zd, Zq, Z0) is computed and outputted by the speed electromotive force observer 25 (later described in detail) based on the voltage (Vd, Vq, V0), the current (Id, Iq, I0) and the vehicle angular speed ω.

By adding the estimated speed electromotive force value (Zd, Zq, Z0), and the computed voltage command value (Vd, Vq, V0) outputted from the current controller 24 at the adder-subtracter 26, dq-axis voltage command value (V*d, V*q, V*0) is obtained. Then the value (V*d, V*q, V*0) is converted into voltage (Vu, Vv, Vw) in a three-phase alternating current coordinate system by a d-q/three-phase converter 23, and the voltage (Vu, Vv, Vw) is outputted as voltage command value toward the power converter 65.

Figure 3:
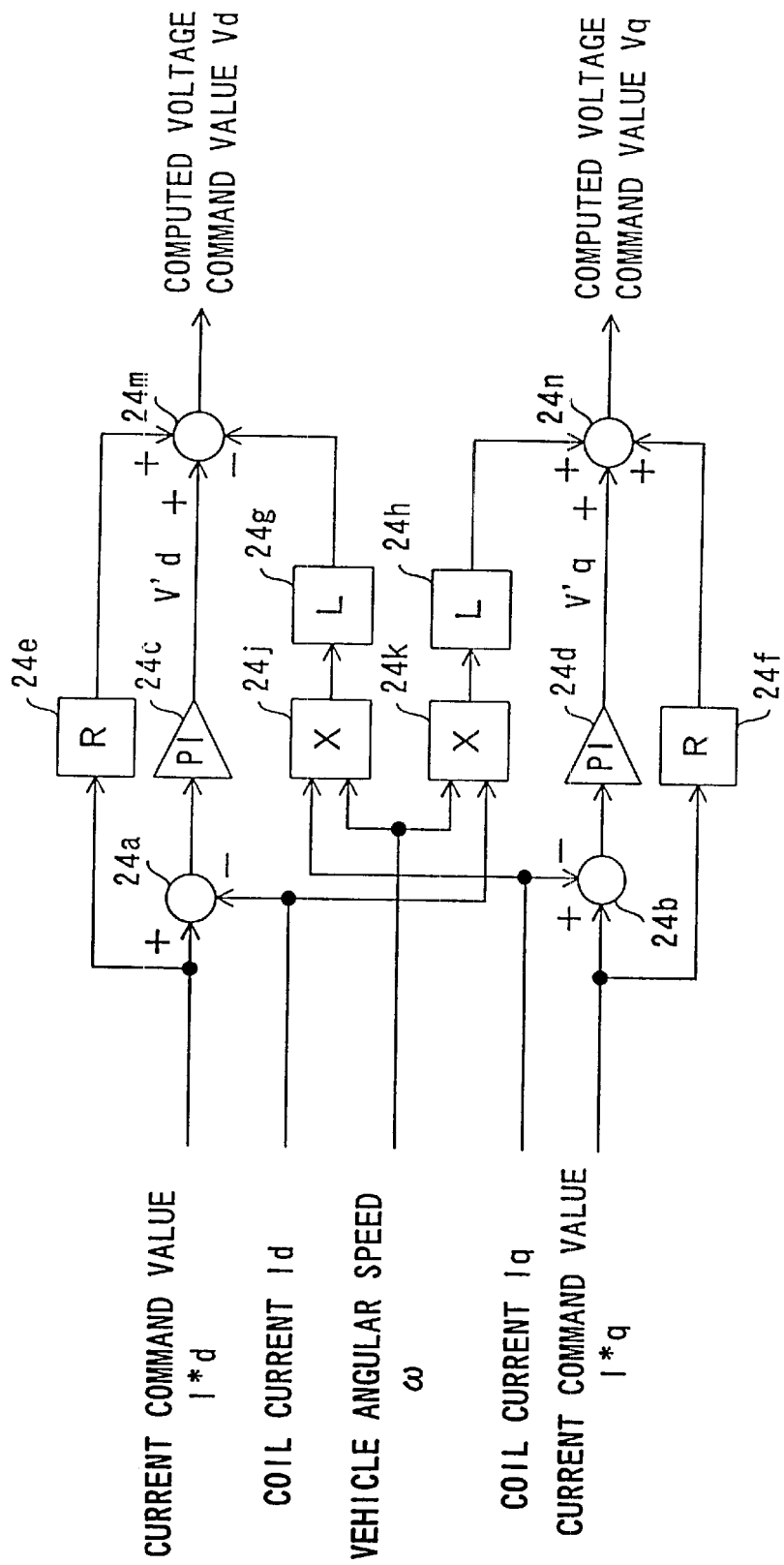
FIG. 3 is a block diagram showing a specific constitution of a current controller.

FIG. 3 shows a constitution of the current controller 24. Adder-subtracters 24a, 24b calculate current deviations between the current command value I* (I*d, I*q) and the coil current I (Id, Iq), respectively. PI calculators 24c, 24d perform proportional-integral operation of the above current deviations to obtain computed voltage values V'd, V'q, respectively. Also, resistance coefficient units 24e, 24f, inductance coefficient units 24g, 24h, and multipliers 24j, 24k calculate voltage drops caused by resistance R and inductance L of the propulsion coil 61 and the feeder 66. Adder-subtracters 24m, 24n compensate the computed voltage values V'd, V'q for the voltage drops, and then the computed voltage command values Vd, Vq are obtained. The resistance R and the inductance L are peculiar to coil sections (See FIGS. 8A and 8B) in the neighborhood of a running vehicle 62, and these values change according to a transition of the coil sections located in the neighborhood of the running vehicle 62. In order to calculate the voltage drops caused by the inductance L, the vehicle angular speed ω is inputted. In the embodiment, a 0-axis component V0 of the voltage command value is also calculated. However, since this V0 is not related directly to finding of a phase reference θ* of the present invention, FIG. 3 shows only a constitution of d-axis and q-axis components, omitting the 0-axis component.

The speed electromotive force phase generator 40 calculates a speed electromotive force phase correction amount Δθ from the estimated speed electromotive force values Zd, Zq estimated in a speed electromotive force observer 25, and adds the calculated Δθ to the phase reference θ* to calculate a speed electromotive force phase θe.

The phase synchronization controller 30 receives, in a predetermined time cycle (5 msec. in the present embodiment), one of the speed electromotive force phase θe and the position detecting phase θp selected by the input phase switch 55 as a phase signal indicating the vehicle position. Compensation operation is performed based on the phase deviation between the received phase signal and the phase reference θ* at the compensation computing unit 32 to obtain the vehicle angular speed ω. Integration of the above vehicle angular speed ω is performed at a speed/phase converter 33 and the phase reference θ* is outputted.

At the compensation computing unit 32, the computed vehicle angular speed ω is also converted into the vehicle speed v, as explained later. Both the vehicle angular speed ω and the vehicle speed v are outputted through a low-pass filter 50.

The input phase switch 45 is to select one of the speed electromotive force phase θe generated at the speed electromotive force phase generator 40 and the position detecting phase θp generated at the position detector 68 as the phase signal to be inputted into the phase synchronization controller 30.

Figure 7:
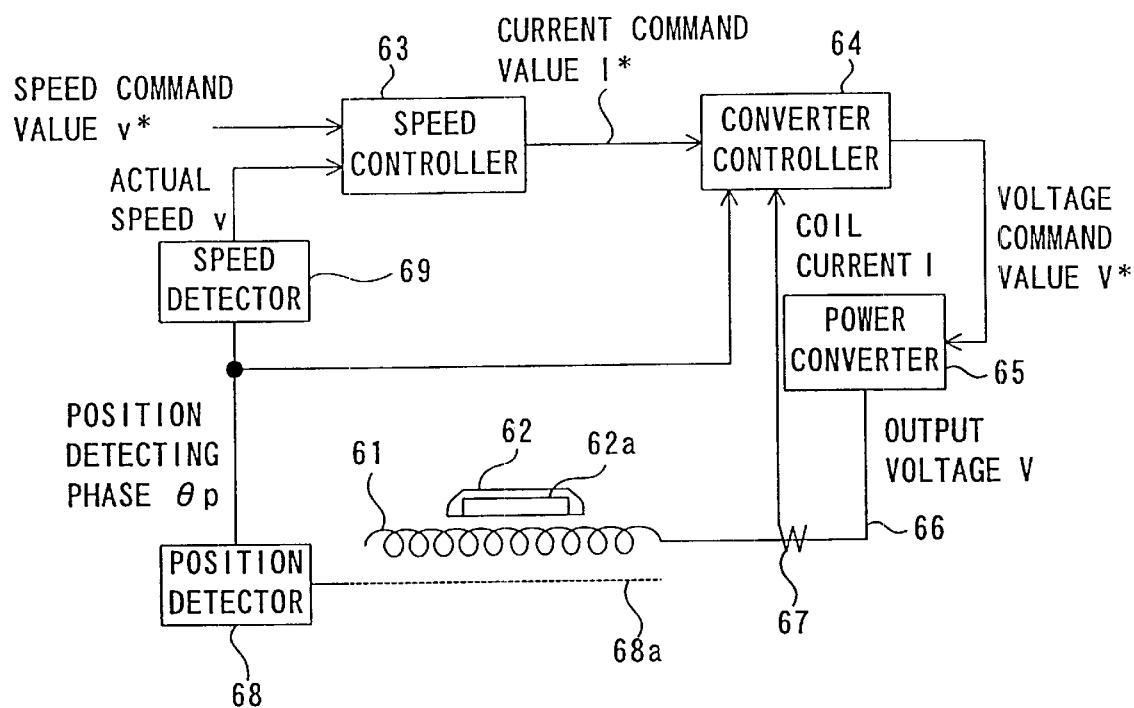
FIG. 7 is a schematic block diagram showing a schematic constitution of a conventional control system of an LSM vehicle.
Figure 8A:
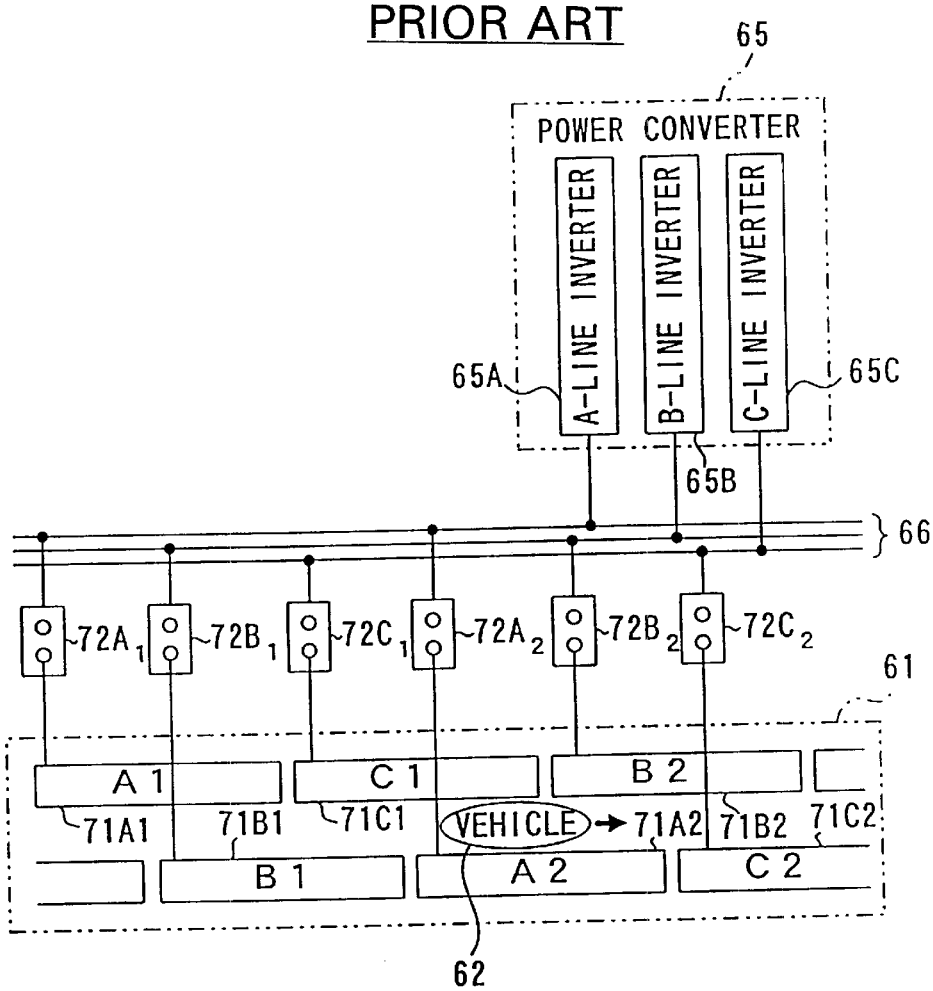
FIGS. 8A and 8B are explanatory views showing a feeder and a propulsion coil in detail.
Figure 8B:
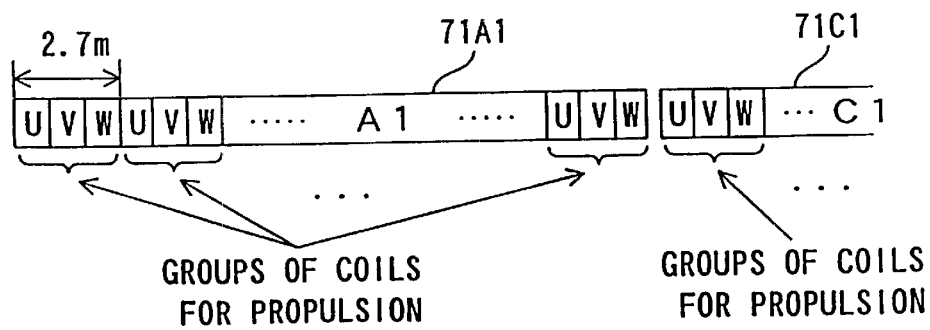
Figure 9:
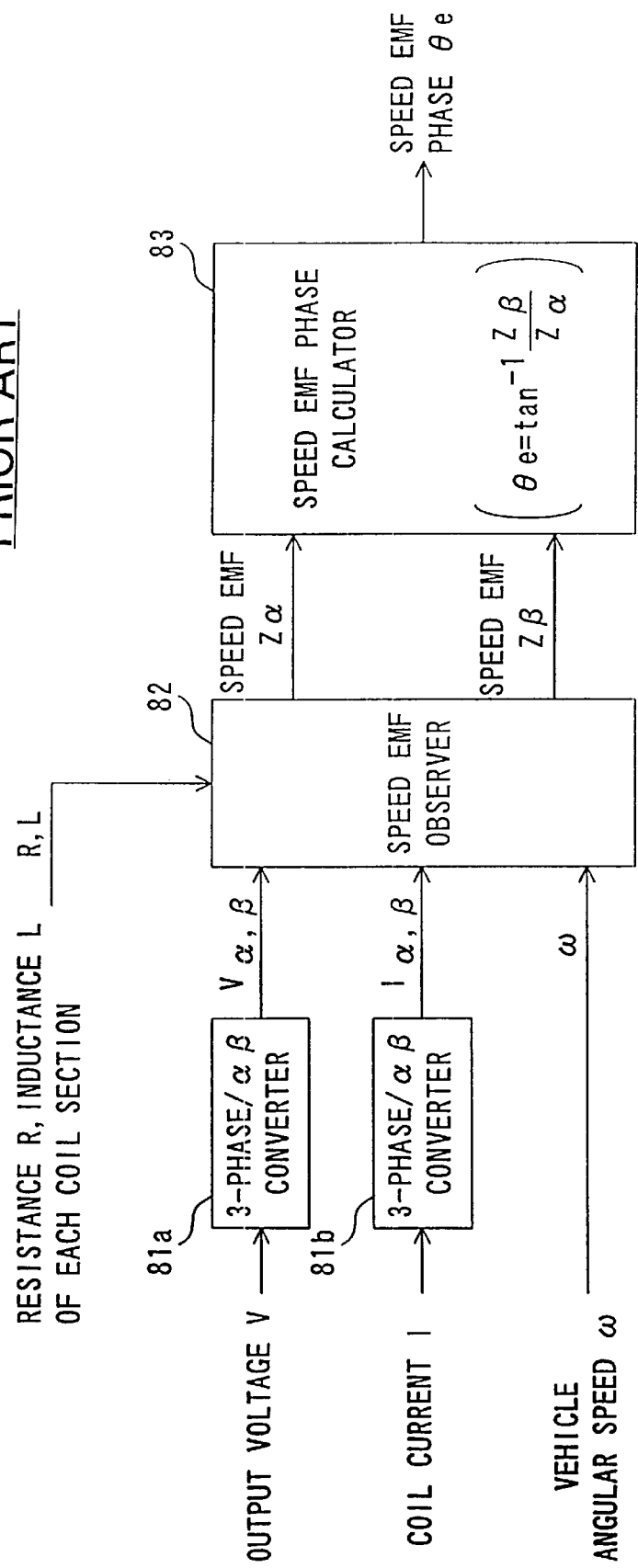
FIG. 9 is a schematic block diagram showing a conventional method of calculating a speed electromotive force phase.

Since all of the propulsion coil 61, the field coil 62a, the power converter 65, the feeder 66, the current detector 67, the cross induction line 68a and the position detector 68 have the same structures, respectively, as described referring to FIG. 7, FIGS. 8A and 8B, the same marks as in FIG. 7, FIGS. 8A and 8B are applied to these components and explanation thereof is omitted.

In the present embodiment, a speed electromotive force phase control system in the present invention comprises the three-phase/d-q converters 21, 22, the speed electromotive force observer 25, the speed electromotive force phase generator 40 and the phase synchronization controller 30. Hereinafter, how the speed electromotive force phase control system, constituted as above, generates the phase reference θ* is explained in detail.

As previously described, the three-phase/d-q converter 22 converts the three-phase output voltage V (Vu, Vv, Vw) outputted to the propulsion coil 61 from the power converter 65 into the voltage (Vd, Vq, V0) in the dq0 rotary coordinate system. And the three-phase/d-q converter 21 converts the coil current I (Iu, Iv, Iw), flowing through the propulsion coil, into the current (Id, Iq, I0) in the dq0 rotary coordinate system. The voltage (Vd, Vq, V0) and the current (Id, Iq, I0) are inputted to the speed electromotive force observer 25.

Here, the coordinate conversion to the dq0 rotary coordinate system from the three-phase alternating current coordinate system and the constitution of the speed electromotive force observer 25 are explained. In the present embodiment, the power converter 65 is constituted as a three-phase four-wire system. Therefore, the relationship between the three-phase output voltage V and the coil current I can be defined as an equation (4) below.

$$Vu = R \cdot Iu + (Ls - M)\frac{d}{dt}Iu + Eu + Rn \cdot Iz + (Ln + M)\frac{d}{dt}Iz$$
$$Vv = R \cdot Iv + (Ls - M)\frac{d}{dt}Iv + Ev + Rn \cdot Iz + (Ln + M)\frac{d}{dt}Iz \quad (4)$$
$$Vw = R \cdot Iw + (Ls - M)\frac{d}{dt}Iw + Ew + Rn \cdot Iz + (Ln + M)\frac{d}{dt}Iz$$

where Iz=Iu+Iv+Iw,
 Eu, Ev, Ew: three-phase speed electromotive force
 R: resistance of the feeder and the coil sections
 Ls: self inductance of the feeder and the coil sections.
 M: mutual inductance of the feeder and the coil sections
 Rn: neutral cable resistance of the feeder and the coil sections
 Ln: neutral cable inductance of the feeder and the coil sections In order to convert the above voltage equation (4), shown in the three-phase alternating current coordinate system, to the two-phase axes d, q and a 0-phase axis (it is so-called dq0 coordinate conversion), an absolute transformation matrix C is defined as the following equation (5). The absolute conversion matrix C converts the above equation (4) to a voltage equation in the dq0 rotary coordinate system, indicated as an equation (6). The phase reference θ* can be used, for example, as θ in the equation (5).

$$C = \sqrt{\frac{2}{3}} \begin{bmatrix} \sin\theta & \sin(\theta - 2\pi/3) & \sin(\theta + 2\pi/3) \\ \cos\theta & \cos(\theta - 2\pi/3) & \cos(\theta + 2\pi/3) \\ 1/\sqrt{2} & 1/\sqrt{2} & 1/\sqrt{2} \end{bmatrix} \quad (5)$$

$$\frac{d}{dt}\begin{bmatrix} Id \\ Iq \\ Io \end{bmatrix} = \begin{bmatrix} -\frac{R}{L} & \omega & 0 \\ -\omega & -\frac{R}{L} & 0 \\ 0 & 0 & -\frac{R+3Rn}{L+3M+3Ln} \end{bmatrix} \begin{bmatrix} Id \\ Iq \\ Io \end{bmatrix} + \begin{bmatrix} -\frac{1}{L} & 0 & 0 \\ 0 & -\frac{1}{L} & 0 \\ 0 & 0 & -\frac{1}{L+3M+3Ln} \end{bmatrix} \begin{bmatrix} Ed - Vd \\ Eq - Vq \\ Eo - Vo \end{bmatrix} \quad (6)$$

where Ed, Eq, E0: speed electromotive force in axes d, q, 0

In the control using the equation (6), a propulsive force of the vehicle can be controlled by regulating a d-axis current Id. Additionally, both q- and 0-axis currents Iq, I0 are regulated to be zero (0).

Now, the theoretical constitution of the speed electromotive force observer 25 is explained. In accordance with the observer theory in the modern control theory, the observer in the dq0 rotary coordinate system is determined. If convergence of the observer is made sufficiently fast, the vehicle angular speed ω and the speed electromotive force Ed, Eq are assumed to be constant. Therefore, the equation (6) is transformed to an equation (7) below.

$$\frac{d}{dt}\begin{bmatrix} I \\ E \end{bmatrix} = \begin{bmatrix} A_{11} & A_{12} \\ 0 & 0 \end{bmatrix}\begin{bmatrix} I \\ E \end{bmatrix} + \begin{bmatrix} C_1 \\ O \end{bmatrix} V \quad (7)$$

where $$I = \begin{bmatrix} Id \\ Iq \end{bmatrix}, E = \begin{bmatrix} Ed \\ Eq \end{bmatrix}, V = \begin{bmatrix} Vd \\ Vq \end{bmatrix}, C_1 = \begin{bmatrix} 1/L & 0 \\ 0 & 1/L \end{bmatrix},$$

$$A_{11} = \begin{bmatrix} -R/L & \omega \\ -\omega & -R/L \end{bmatrix}, A_{12} = \begin{bmatrix} -1/L & 0 \\ 0 & -1/L \end{bmatrix}$$

When the estimated values of the speed electromotive force Ed, Eq are assumed to be Zd, Zq, the observer is given by an equation (8) according to the minimal dimension observer theory.

$$\frac{d}{dt}Z = G_1\left(\frac{d}{dt}I - A_{11}I - A_{12}Z - C_1V\right) \quad (8)$$

where $$Z = \begin{bmatrix} Zd \\ Zq \end{bmatrix}, G_1 = \begin{bmatrix} g_1 & -g_2 \\ g_2 & g_1 \end{bmatrix}$$

A characteristic value λ of the observer given by the equation (8) can be obtained from an equation (9) below. In this equation (9), if g1 is negative, the system is to be stabilized.

$$\lambda = \frac{1}{L}(g_1 \pm jg_2) \quad (9)$$

And the estimated speed electromotive force value Z is obtained from an equation (10) below, by integrating the equation (8).

$$Z=G_1I-G_1\int\{A_{11}I+A_{12}Z+C_1V\}dt \quad (10)$$

To determine an optimal value of an observer gain G1, it is necessary that a response time constant of the observer be set not only sufficiently faster than a response time constant of the phase synchronization controller 30 which is a higher order control system than the speed electromotive force observer 25, but also slower than response speeds of a filter inside the current detector 67 and the control system so as not to be affected by their delay.

Figure 4:
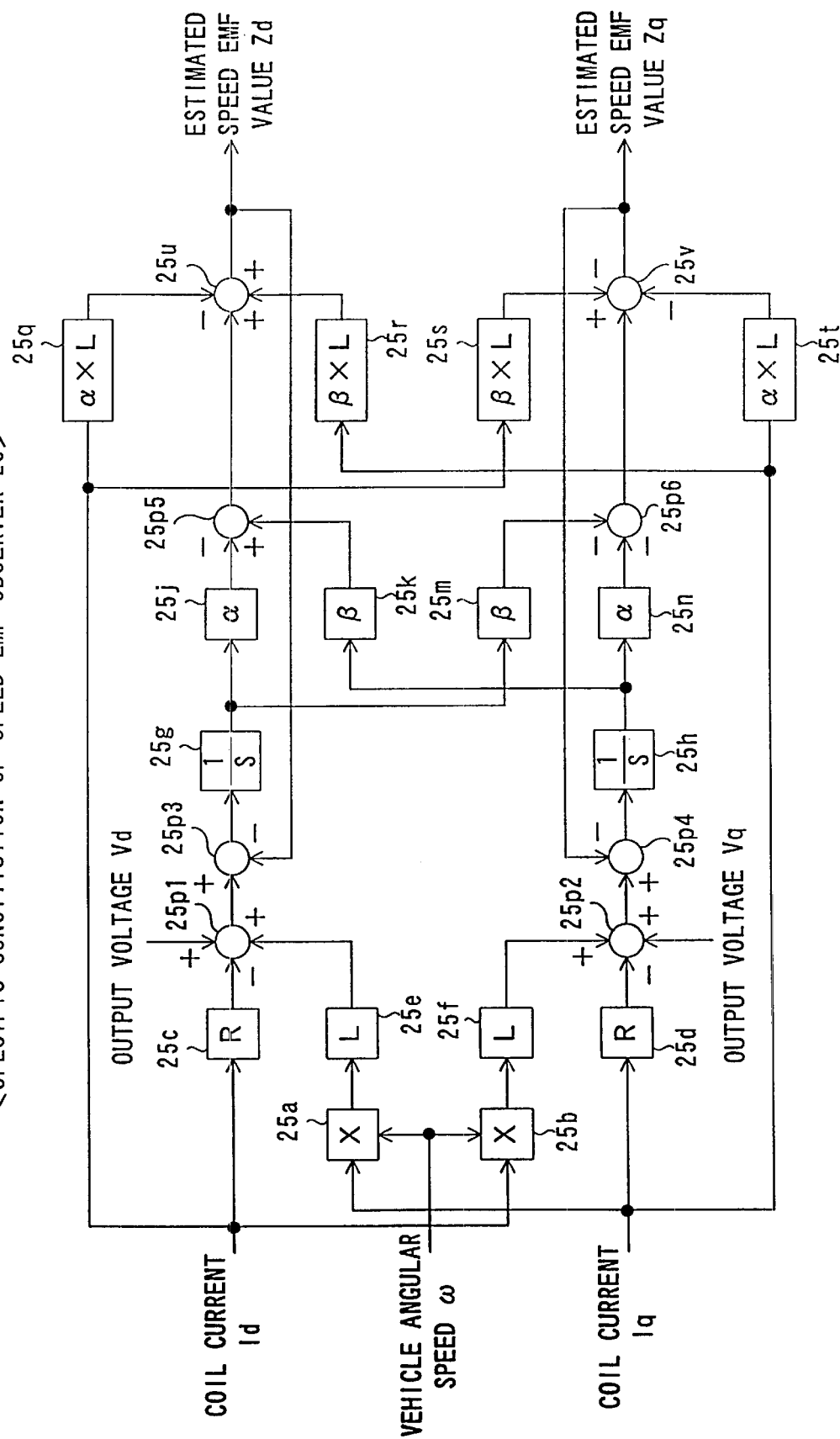
FIG. 4 is a block diagram showing a specific constitution of a speed electromotive force observer.

FIG. 4 shows a specific constitution of the speed electromotive force observer 25 obtained by the equation (8). α indicates a real part and β indicates an imaginary part of the characteristic value λ of the observer. In FIG. 4, multipliers 25a, 25b, resistance coefficient units 25c, 25d, inductance coefficient units 25e, 25f, integrators 25g, 25h, characteristic value coefficient units 25j, 25k, 25m, 25n, and adder-subtracters 25p1, 25p2, 25p3, 25p4, 25p5, 25p6 calculate each component of the second term in the right side of the equation (10). Gain coefficient units 25q, 25r, 25s, 25t calculate the first term in the right side of the equation (10). Then, adder-subtracters 25u, 25v calculate the entire right side of the equation (10) and the estimated speed electromotive force values Zd, Zq are obtained.

As in the case of the current controller 24 in FIG. 3, a 0-axis component Z0 of the estimated speed electromotive force value is also calculated. However, since this Z0 is not related directly to finding of the phase reference θ* of the present invention, FIG. 4 shows only a constitution of d-axis and q-axis components, omitting the 0-axis component.

In the speed electromotive force phase generator 40, a speed electromotive force phase correction computing unit 41 calculates the speed electromotive force phase correction amount Δθ using an equation (11), based on the estimated speed electromotive force values Zd, Zq estimated in the speed electromotive force observer 25.

$$\Delta\theta = \tan^{-1}\frac{Zq}{Zd} \quad (11)$$

An adder-subtracter 42 adds up this speed electromotive force phase correction amount Δθ and the phase reference θ* currently outputted, to calculate the speed electromotive force phase θe.

Figure 5:
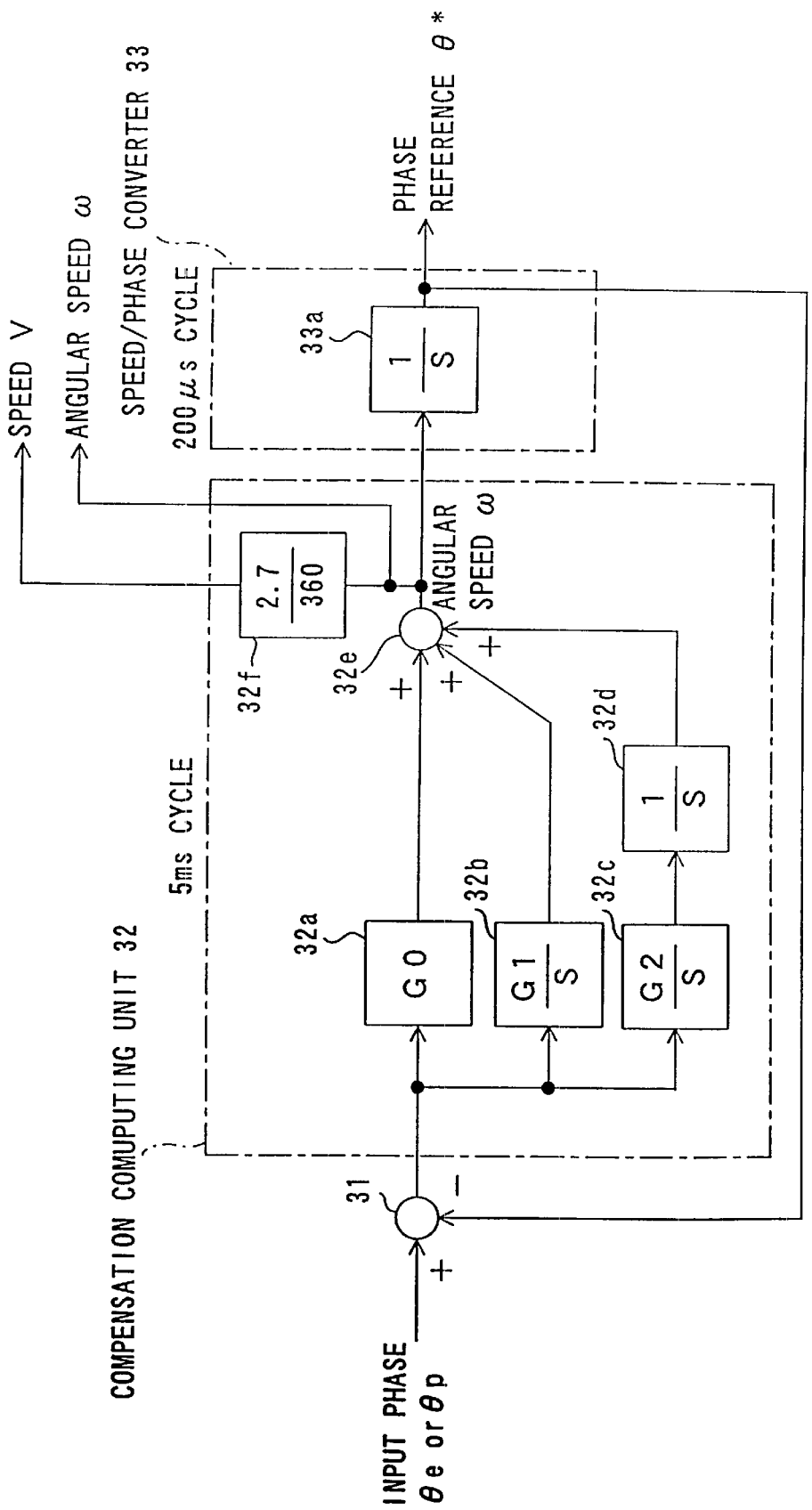
FIG. 5 is a block diagram showing a specific constitution of a phase synchronization controller.

The speed electromotive force phase θe, obtained in the speed electromotive force phase generator 40, is inputted to the phase synchronization controller 30 through the input phase switch 45. FIG. 5 shows a specific constitution of the phase synchronization controller 30.

The phase synchronization controller 30 receives, in a predetermined time cycle (5 msec. in the present embodiment), one of the speed electromotive force phase θe and the position detecting phase θp as a phase signal. The phase deviation between the received phase signal and the presently outputted phase reference θ* is calculated by an adder-subtracter 31, and based on the computed phase deviation, the vehicle angular speed ω is obtained at the compensation computing unit 32. The compensation computing unit 32 is designed as a secondary PI control system comprising a proportionator 32a, integrators 32b, 32c, 32d, and an adder-subtracter 32e, and it is a control system for stabilizing an input phase by reducing a steady-state deviation to zero at the time of increasing or decreasing the speed. Integration of the vehicle angular speed ω calculated at the compensation computing unit 32 is performed at an integrator 33a of a speed/phase converter 33 and the phase reference θ* is obtained.

While input of the phase signal is performed every 5 msec. as mentioned above, inverter control at the power converter 65 is performed according to PWM control, the cycle of which is about 300 Hz. Therefore, it is preferable that the phase reference θ* is outputted in a shorter cycle than the cycle of the PWM control, for example, in a cycle of 200 μsec.

The vehicle angular speed ω is outputted to the converter controller 20, converted to the vehicle speed v in an angular speed/speed converter 32f and received by the speed controller 10.

Figure 6:
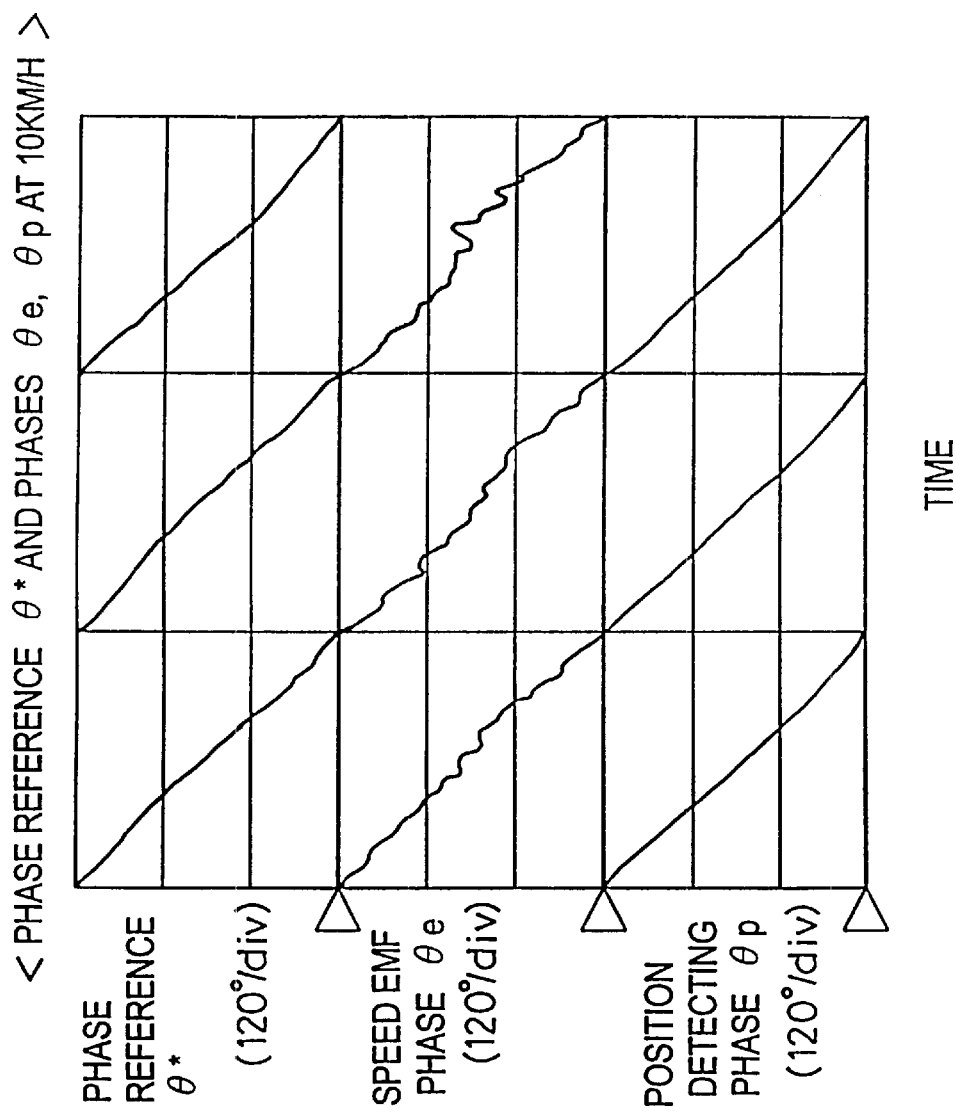
FIG. 6 is an explanatory diagram showing waveforms of a phase reference, a speed electromotive force phase and a position detecting phase when a vehicle is running at a speed of 10 km/h.

FIG. 6 shows a specific example of the phase reference θ* obtained in the above manner. FIG. 6 shows the phase reference θ* when the vehicle is running at low speed of 10 km/h, together with the speed electromotive force phase θe and the position detecting phase θp. As seen in FIG. 6, when the vehicle is running at 10 km/h, the speed electromotive force phase θe becomes unstable due to small speed electromotive force, and it is difficult to use this speed electromotive force phase θe directly as the phase reference. However, the phase synchronization controller 30 outputs the stabilized phase reference θ* with a well-reduced deviation of the speed electromotive force phase θe, and the output is in no way inferior to the position detecting phase θp which is conventionally used.

As described above in detail, in the control system for an LSM vehicle according to the present embodiment, the speed electromotive force phase θe is computed based on the estimated speed electromotive force in the dq0 rotary coordinate system, and then stabilized at the phase synchronization controller 30 to be outputted as the phase reference θ* indicating the vehicle position.

As is apparent from the foregoing description, according to the control system for an LSM vehicle in the present embodiment, the speed electromotive force in the dq0 rotary coordinate system is estimated at the speed electromotive force observer 25, and the speed electromotive force phase θe is computed by correcting the phase reference θ* using the speed electromotive force phase correction amount Δθ obtained from the estimated speed electromotive force value to be outputted as the phase reference θ* by the phase synchronization controller 30. Furthermore, since this phase synchronization controller 30 is constituted as the secondary PI control system, even if the speed electromotive force is small at low speed such as under 15km/h, for example, the stable phase reference θ with the well-reduced deviation can be obtained.

Additionally, due to the constitution of using one of the speed electromotive force phase θe and the position detecting phase θp selected by the input phase switch 45 as the phase reference θ*, reliability of the control system of the LSM vehicle can be greatly improved, for it is possible to use the position detecting phase θp in a normal condition, and to use the speed electromotive force phase θe when the position detector 68 or the cross induction line 68a is in bad condition, for example Although the present invention has been described in connection with a preferred embodiment, it is to be clearly understood that the invention is not limited to the present embodiment but may be embodied in a variety of ways without departing from the scope of the invention, which should be determined with reference to the claims.

For example, while one of the speed electromotive force phase θe and the position detecting phase θp is received as the phase signal to the phase synchronization controller 30 in the above embodiment, it is possible that only the speed electromotive force phase θe is used to obtain the phase reference θ*. This is possible because the present invention allows the speed electromotive force phase θe to be estimated accurately at any running speed and therefore, it is possible to remove the ground installations such as the cross induction line 68*a*. This arrangement extremely reduces a large amount of labor and costs taken by the maintenance of the ground installations, and therefore leads to a great economic advantage.

Also, while the compensation computing unit inside the phase synchronization controller 30 is designed as the secondary PI control system in the above embodiment, the compensation computing unit may be designed as a primary PI control system. In this case, however, it is likely that the steady-state deviation becomes large upon accelerating or decelerating of the vehicle 62. Therefore, it is necessary to keep the steady-state deviation within permissible limits by providing an appropriate control constant.

What is claimed is:

1. A speed electromotive force phase control system adapted to low speed, in a control system for driving a linear synchronous motor vehicle, comprising a propulsion coil laid along a guideway on the ground; a field coil mounted on the vehicle to face the propulsion coil; a speed control means for outputting a current command value; a conversion control means for outputting a voltage command value based on the current command value, a coil current I flowing through the propulsion coil and a vehicle position signal; and a power conversion means for outputting an output voltage V to the propulsion coil according to the voltage command value, the speed electromotive force phase control system generating a phase reference θ, indicating a relative position of said field coil to said propulsion coil by an electrical angle, as said vehicle position signal when the vehicle is running under a predetermined speed, and comprising:

a dq conversion means for converting said output voltage V and said coil current I to a d-axis voltage Vd, a q-axis voltage Vq, a d-axis current Id and a q-axis current Iq, respectively, in dq rotary coordinate system;

a speed electromotive force estimation means for estimating speed electromotive force to be induced in said propulsion coil based on said voltages Vd, Vq and said currents Id, Iq, obtained by said dq conversion means, and a vehicle angular speed ω;

a Δθ calculation means for calculating a speed electromotive force phase correction amount Δθ by an equation (1) below, using a d-axis component Zd and a q-axis component Zq of an estimated speed electromotive force value estimated in said speed electromotive force estimation means;

a speed electromotive force phase calculation means for calculating a speed electromotive force phase θe, by adding said speed electromotive force phase correction amount Δθ obtained in said Δθ calculation means to said phase reference θ currently outputted; and a phase signal stabilization means for outputting said phase reference θ with a reduced steady-state deviation, by calculating a phase deviation between said speed electromotive force phase θe to be inputted as a phase signal and said phase reference θ currently outputted, and performing proportional-integral operation of said phase deviation.

$$\Delta\theta = \tan^{-1}\frac{Zq}{Zd} \quad (1)$$

2. A speed electromotive force phase control system adapted to low speed as set forth in claim 1, wherein said phase signal stabilization means calculates said phase reference θ, by performing proportional-integral and double-integral operation of said phase deviation and adding up each calculated value to calculate a vehicle angular speed ω, and further integrating the vehicle angular speed ω.

3. A speed electromotive force phase control system adapted to low speed as set forth in claim 1, wherein said speed electromotive force estimation means obtains said estimated speed electromotive force values Zd, Zq by calculating according to an equation (2) below.

$$Z=GI-G\int\{AI+BZ+CV\}dt \quad (2)$$

where $$Z = \begin{bmatrix} Zd \\ Zq \end{bmatrix}, I = \begin{bmatrix} Id \\ Iq \end{bmatrix}, V = \begin{bmatrix} Vd \\ Vq \end{bmatrix}, G = \begin{bmatrix} g_{11} & g_{12} \\ g_{21} & g_{22} \end{bmatrix}$$

$$A = \begin{bmatrix} a_{11} & a_{12} \\ a_{21} & a_{22} \end{bmatrix}, B = \begin{bmatrix} b_{11} & b_{12} \\ b_{21} & b_{22} \end{bmatrix}, C = \begin{bmatrix} c_{11} & c_{12} \\ c_{21} & c_{22} \end{bmatrix}$$

and $$\left.\begin{matrix} a_{11}\sim a_{22} \\ b_{11}\sim b_{22} \\ c_{11}\sim c_{22} \end{matrix}\right\} : \text{coefficients set by resistance and inductance of the propulsion coil, and the vehicle angular speed } \omega$$

$g_{11}\sim g_{22}$ : gain coefficients

4. A speed electromotive force phase control system adapted to low speed as set forth in claim 1, wherein an input phase signal selection means selects one of said speed electromotive force phase θe and a position detecting phase θp obtained from a position detecting phase generation means provided on said guideway as a vehicle position signal, and inputs it to said phase signal stabilization means as said phase reference.

* * * * *